United States Patent
Adams

(10) Patent No.: US 12,069,516 B1
(45) Date of Patent: Aug. 20, 2024

(54) PARALLEL MULTI-BIT LOW LATENCY WIRELESS MESSAGING

(71) Applicant: Spectranet, Inc., Seattle, WA (US)

(72) Inventor: Jeffrey C. Adams, Seattle, WA (US)

(73) Assignee: SpectraNet, Inc., Seattle, WA (US)

( * ) Notice: Subject to any disclaimer, the term of this patent is extended or adjusted under 35 U.S.C. 154(b) by 319 days.

(21) Appl. No.: 17/334,764

(22) Filed: May 30, 2021

Related U.S. Application Data

(63) Continuation of application No. 16/571,629, filed on Sep. 16, 2019, now Pat. No. 11,032,742, which is a continuation of application No. 15/371,437, filed on Dec. 7, 2016, now Pat. No. 10,419,975.

(60) Provisional application No. 62/266,270, filed on Dec. 11, 2015.

(51) Int. Cl.
| | |
|---|---|
| *H04W 28/18* | (2009.01) |
| *H04L 5/00* | (2006.01) |
| *H04W 4/12* | (2009.01) |
| *H04W 72/56* | (2023.01) |

(52) U.S. Cl.
CPC ........... *H04W 28/18* (2013.01); *H04L 5/0048* (2013.01); *H04W 4/12* (2013.01); *H04W 72/56* (2023.01)

(58) Field of Classification Search
CPC ....... H04W 28/18; H04W 4/12; H04W 72/56; H04L 5/0048
See application file for complete search history.

(56) References Cited

U.S. PATENT DOCUMENTS

| | | | | |
|---|---|---|---|---|
| 7,463,189 | B2 * | 12/2008 | Bryant | G01S 19/06 375/148 |
| 9,762,364 | B2 * | 9/2017 | Linden | H04L 5/0094 |
| 10,211,814 | B2 * | 2/2019 | Kuhwald | H03M 1/0626 |
| 10,264,525 | B2 * | 4/2019 | Pratt | H04W 40/16 |
| 10,419,975 | B1 * | 9/2019 | Adams | H04L 5/0048 |
| 10,461,905 | B2 * | 10/2019 | Linden | H04L 5/0094 |
| 10,574,390 | B2 * | 2/2020 | Vojcic | H04L 25/022 |
| 11,032,742 | B1 * | 6/2021 | Adams | H04W 72/56 |
| 11,205,058 | B2 * | 12/2021 | Volpi | G06K 7/0008 |
| 2009/0243927 | A1 * | 10/2009 | Krach | G01S 19/22 342/357.77 |
| 2011/0003608 | A1 * | 1/2011 | Forenza | H04B 7/01 455/500 |
| 2014/0119316 | A1 * | 5/2014 | Linden | H04W 72/02 370/329 |
| 2018/0019850 | A1 * | 1/2018 | Linden | H04L 5/0048 |
| 2019/0164400 | A1 * | 5/2019 | Harman | G08B 13/2497 |

* cited by examiner

*Primary Examiner* — Brian T O Connor
(74) *Attorney, Agent, or Firm* — David Chin; Chin IP, PLLC

(57) ABSTRACT

Technology for wireless transmission and reception of messages is disclosed. The disclosed technology includes detection and/or reception of messages in a manner in which the receiver latency for a message is automatically adjusted for each particular message. For example, the receiver latency for each message may be automatically adjusted based on channel conditions, e.g., instantaneous channel conditions, between the transmitter and receiver at the time that message is transmitted/received. For example, the receiver latency for a message may be proportional or otherwise associated with to the signal-to-noise ratio ("SNR") at the receiver at the time that message is received.

17 Claims, 10 Drawing Sheets

| Trading Symbol | Encoded Representation | Encoded Transaction Type | Encoded Quantity | Encoded Message |
|---|---|---|---|---|
| | | Buy = 1<br>Sell = 0 | 00 = 1,000<br>01 = 5,000<br>10 = 10,000<br>11 = 50,000 | |
| ABC | 000 | 1 | 01 | 000101 |
| DEF | 010 | 1 | 10 | 010110 |
| GHI | 011 | 0 | 11 | 011011 |
| JKL | 101 | 0 | 10 | 101010 |
| MNP | 110 | 0 | 11 | 110011 |

Table 1: Examples of Encoded Messages

| Trading Symbol | Encoded Representation | Encoded Transaction Type<br><br>Buy = 1<br>Sell = 0 | Encoded Quantity<br><br>00 = 1,000<br>01 = 5,000<br>10 = 10,000<br>11 = 50,000 | Encoded Message |
|---|---|---|---|---|
| ABC | 000 | 1 | 01 | 000101 |
| DEF | 010 | 1 | 10 | 010110 |
| GHI | 011 | 0 | 11 | 011011 |
| JKL | 101 | 0 | 10 | 101010 |
| MNP | 110 | 0 | 11 | 110011 |

Table 1: Examples of Encoded Messages

*FIG. 7*

| Trading Symbol Sequences | Encoded Representation | Encoded Transaction Type | Encoded Quantity | Encoded Message |
|---|---|---|---|---|
| | | Buy = 1<br>Sell = 0 | 00 = 1,000<br>01 = 5,000<br>10 = 10,000<br>11 = 50,000 | |
| *ABC*, DEF, GHI | 100 | 1 | 01 | 100101 |
| ABC, *DEF*, GHI | 100 | 1 | 10 | 100110 |
| ABC, DEF, *GHI* | 001 | 0 | 11 | 001011 |

Table 2: Additional Examples of Encoded Messages

FIG. 8

| Time of Day | Trading Symbol | Encoded Transaction Type | Encoded Quantity | Encoded Message |
|---|---|---|---|---|
| | | Buy = 1<br>Sell = 0 | 00 = 1,000<br>01 = 5,000<br>10 = 10,000<br>11 = 50,000 | |
| 10:00:10 | ABC | 1 | 01 | 101 |
| 10:00:20 | DEF | 1 | 10 | 110 |
| 10:00:30 | GHI | 0 | 11 | 011 |
| 10:00:40 | JKL | 1 | 00 | 100 |
| 10:00:50 | MNP | 0 | 00 | 000 |
| 10:01:00 | XYZ | 0 | 11 | 011 |

Table 3: Additional Examples of Encoded Message

*FIG. 9*

PARALLEL MULTI-BIT LOW LATENCY WIRELESS MESSAGING

CROSS REFERENCE TO RELATED APPLICATION

This application is a continuation of U.S. patent application Ser. No. 16/571,629, filed Sep. 16, 2019, entitled "PARALLEL MULTI-BIT LOW LATENCY WIRELESS MESSAGING", which is a continuation of U.S. patent application Ser. No. 15/371,437, filed Dec. 7, 2016, entitled "PARALLEL MULTI-BIT LOW LATENCY WIRELESS MESSAGING", which claims priority to U.S. Provisional Pat. App. No. 62/266,270 filed on Dec. 11, 2015 entitled "PARALLEL MULTI-BIT LOW LATENCY WIRELESS MESSAGING". The entirety of each of these afore-mentioned application(s) is incorporated herein by reference.

BACKGROUND

Data consumption has been increasing at a rapid rate in recent years. As part of this increase, consumers are demanding increased bandwidth, and service providers are scrambling to improve communication network infrastructure and services. For example, as of 2013, Long Term Evolution (LTE) boasts downlink peak data rates that can exceed 100 Mbit/s. Likewise, Mobile Worldwide Interoperability for Microwave Access (WiMax) release 2 supports a per site downlink of 120 Mbit/s, and Data over Cable Interface Specification (DOCSIS) 3.0 supports a downlink of up to 160 Mbit/s. Delivery of such high data throughput has been made possible by, among other things, better bandwidth allocation, higher order modulation, and shorter transmission time intervals. Consumers also tend to expect their data communications to be secure and uncorrupted. Thus, better encryption and channel coding techniques have emerged.

Most consumers, however, are less interested in communication latency because many applications can tolerate significant latency (e.g., milliseconds or even seconds of latency) without degrading the consumers' experience. Consumers have long grown accustomed to delayed delivery of data, such as emails and text messages, as these types of data are generally routed through several networks, which are sometimes located in multiple continents, before reaching their destination.

Other consumers, however, may favor a communication system with low latency as it may provide certain advantages. For these consumers, a latency difference, for example, of tens of microseconds could translate to revenue differences of millions of dollars.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein:

FIG. 7 is a table of message encoding examples according to aspects of the technology;

FIG. 8 is another table of message encoding examples according to aspects of the technology;

FIG. 9 is yet another table of message encoding examples according to aspects of the technology.

DETAILED DESCRIPTION

Figure 1:
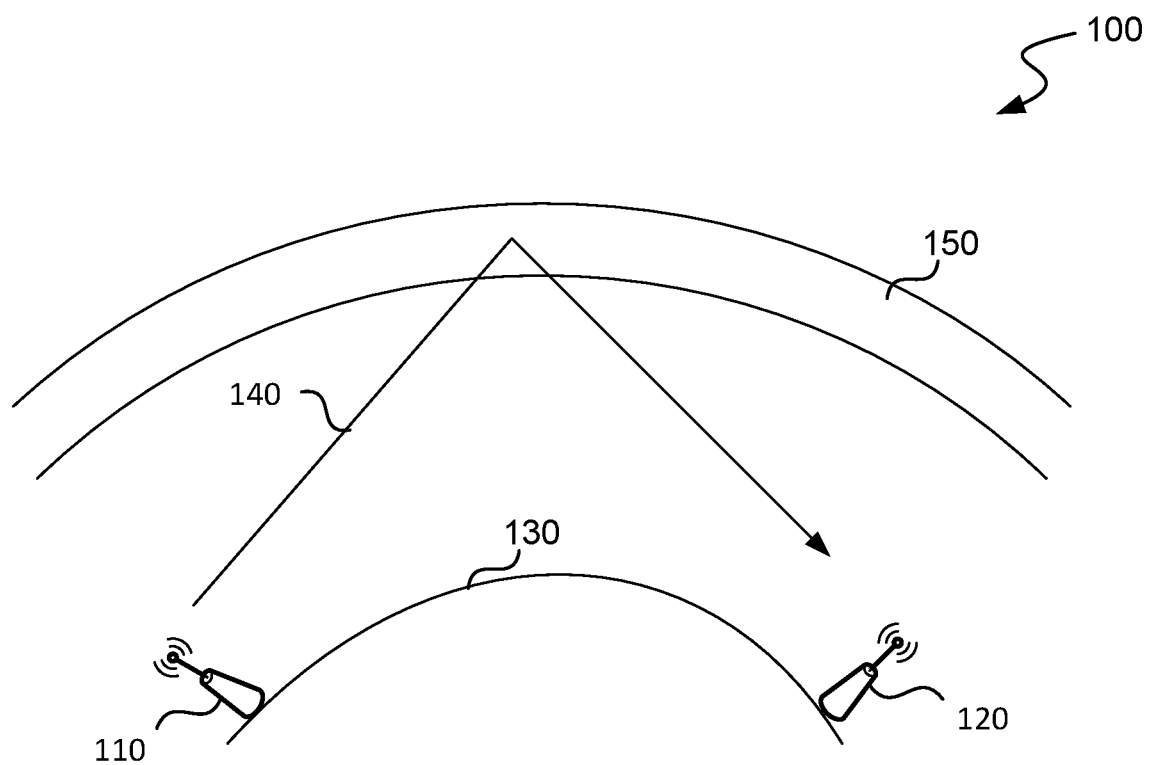
FIG. 1 is a diagram illustrating one example of a suitable environment in which aspects of the technology may be employed.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Introduction

Technology for wireless transmission and reception of messages is disclosed. The disclosed technology includes detection and/or reception of messages in a manner in which the receiver latency for a message is automatically adjusted for each particular message. For example, the receiver latency for each message may be automatically adjusted based on channel conditions, e.g., instantaneous channel conditions, between the transmitter and receiver at the time that message is transmitted/received. For example, the receiver latency for a message may be proportional or otherwise associated with to the signal-to-noise ratio ("SNR") at the receiver at the time that message is received.

The disclosed technology also includes encoding a bit via the presence or absence of tone at a particular encoding frequency. Multiple bits may be transmitted in parallel through use of multiple encoding frequencies where the presence or absence of a tone at each particular frequency indicates the value of a corresponding bit. The encoding frequency(-ies), optionally including a pilot tone, may be mixed with a carrier signal, and the resulting signal can be transmitted to the receiver. A transmitter for encoding and transmitting messages in this and other manners is disclosed herewith.

Reception of signals may include receiving a transmitted signal, down-converting the received signal (e.g., to remove the carrier signal, to extract/recover the encoding frequency(-ies), etc.), detecting the presence or absence of tone(s) at the encoding frequency(-ies), and determining the message based on the presence or absence of the tone(s). The presence or absence of the tone(s) may be detected by receiver-based integration, e.g., of the down-converted signal. In one parallel multi-bit example, the receiver may band-pass filter individual encoding frequencies, integrate the filtered signals, and compare the filtered outputs to a detection threshold. In this example, the receiver may determine the value of the message in response to one or more integrated signals crossing the detection threshold. For example, the receiver may determine the values of the message bits based on the integrated values relative to bit value thresholds when the one or more integrated signals cross the detection threshold. A receiver for receiving and decoding messages in this and other manners is disclosed herewith.

In this and other examples, the time it takes for the receiver to determine the message may be proportional to the SNR at the receiver for the received signal. For example, if a tone is received in high SNR conditions, the integration will progress at a more rapid rate, while a tone received in low SNR conditions will cause the integration to progress at a slower rate. Since this example receiver latency is based on the integrated value reaching a threshold, the receiver latency may be automatically adjusted for each message based on SNR with which that particular message is received. In this manner, the receiver, in effect, dwells on each channel signal until the receiver can determine whether the channel (or sub-channel) carries a 1 or 0. In at least some examples, the disclosed technology automatically detects messages with the "best" or "optimal" latency for the received SNR for that message.

Another example includes a method of encoding a digital message, transmitting the message, and receiving and decoding the original transmitted message, where the receiver estimates the transmission channel noise so that a SNR level can be determined to allow reliable decoding, and where the received signal "envelope" on each receive channel is integrated/summed/accumulated as long as needed to provide reliable reception of the message. If the SNR is high, then the message is decoded in less time; if the SNR is low then more integration time/decoding time is longer. Each narrow-band transmit channel may be a frequency tone of some duration, such as 25 ms. In a specific example, the receiver might adequately decode the message bit in a channel in the first 1 ms of the transmitted tone that lasts 25 ms (in a good SNR channel environment), or maybe it would take 6 ms in a noisier channel.

Since a tone (such as an audio tone) has a relatively narrow bandwidth, a number of "sub-channels" could reside within a frequency channel such as a 2.8 kHz HF communications channel. Furthermore, since noise power is proportional to bandwidth, each sub-channel would have less noise than a single wider channel, and since the signal amplitude can be the same, the signal-to-noise (SNR) has been increased. Also, since the sub-channels can operate in parallel, message latency is reduced since each bit is sent simultaneously within the larger channel (for example, 2.8 kHz). Even if the message is only 8 bits, this still represents $2^8=256$ different words, commands, etc., and could be useful for any telemetry or commands that benefit from low latency, such as for High Frequency Trading (HFT) transactions.

One of the many advantages of the present technology is that the receiver, in effect, "decides" when the SNR allows decoding/reception of the signal with adequate reliability, and therefore does not require handshaking with the transmit side to choose a data-rate or modulation for the present channel conditions. Removing this handshaking vastly decreases latency, especially for long transmission paths, e.g., transmission paths that are typically associated with greater propagation delay. In addition, the receiver does not have ask the originating side to re-send the message, lower the data-rate, or increase error correction at the expense of latency as with more conventional methods. Rather, the receiver dwells on the channel (or sub-channel) until the receiver has determined that it can adequately decode the message (or possibly a timeout has been reached). Further, at least some embodiments of the present technology may avoid use of "training sequences" to lock a receiver to a signal. Such training sequences may, at times, significantly increase latency, e.g., if a training sequence is in process at the time a message is to be transmitted.

The transmit tone duration on each sub-channel can be set to whatever value is useful, for example, 1 us to 10 seconds. In the case of an HFT application, there may be an upper limit to the tone duration that depends on the maximum tolerable latency. If this maximum duration is not enough for the receiver to integrate-up a signal value that can be decoded as a "1" or "0", then the associated transmitter can send a reply that the message was not received, and to re-send, possibly on a different carrier frequency.

Yet another example includes encoding a digital message, transmitting the message, and receiving and decoding the original transmitted message, where the transmitter sends an N-bit message, where the presence or absence of a tone on each sub-channel indicates a 1 or 0, hence a 10 bit message is sent using 10 different frequency tones of some duration adequately long enough to satisfy FCC or other emission limits/requirements (e.g., because a longer duration tone reduces the spectral breadth). An individual receiver, or receiver portion, may be used for each tone frequency such that other unintended frequencies are filtered out using a narrow-band filter, either analog or digital. This filtered signal is then squared or "detected" or in a digital system, the signal might be effectively put through an absolute value function so all signal voltage swings are positive going. (E.g, so negative voltage swings do not subtract from the integration of the positive going voltage swings). Now, the positive signal is integrated/summed/accumulated until the SNR is sufficiently high to indicate a "1", and if not, then the receive sub-channel is a "0". However, in another system a positive signal may be integrated/summed/accumulated until the SNR is sufficiently high to indicate a "0", and if not, then the receive sub-channel is a "1".

The receiver may then be reset to receive the next message. Additionally, the receiver may be reset at a given time (e.g., every 25 ms), in response to a detection of a message, via a signal sent from the transmitter or another source over an out-of-band communications link, or the like.

Before a message is sent, the receiver could measure the channel noise, and also measure the average strength of a test signal or other pilot signal that is sent with the message. With this information, an SNR threshold could be determined (manually or automatically) that provides some level of reliability for correct decoding of the message. Additionally, a receiver could look at a nearby frequency that is not being used to "learn" the integrated signal from random noise on the channel. It could then "set", manually or automatically, the threshold based on the "learned" expected integrated signal level of a "0" and a "1" for a desired bit error rate ("BER").

In another example, phase modulation of a channel provides yet another means for communication simultaneous with the technology described herein. For example, phase modulation such as phase shift keying (PSK), 8-PSK, 16 PSK, minimum shift keying (MSK), On-Off keying (OOK), etc. could be employed with such a channel. Some path(s)/channel(s) could employ the technology of the preceding paragraphs, and other path(s) from the same or other source could be encoded/decoded using phase modulation.

In further examples, the present technology also includes use of other RF detection technologies, e.g., to provide enhanced performance. For example, a particular tone frequency (such as 1 kHz) could be first detected using a Fast Fourier Transform ("FFT"), the Goertzel algorithm (single-bin/single tone detection)m and/or the like. As one specific example, sampling/detecting may be performed for an integer number of tone cycles using FFT and/or Goertzel technology, e.g., as use of an integer number of tone cycles may provide for improved frequency resolution. In such an example, a sampling duration of multiple periods of the tone frequency would be associated with sampling/detecting an integer number of samples of a received tone (e.g., a 1 kHz tone down-converted from the modulated RF carrier). Continuing with this example, a 1 kHz tone that is A/D sampled with such FFT or Goertzel technology would have a sampling duration of 1 ms, 2 ms, 3 ms, etc.

However, by combining the present receiver-integration technology with FFT or Goertzel technology, non-integer detection periods could be employed. More specifically, the FFT or Goertzel algorithm could be employed for the first N cycles of the sampled tone (e.g., to "jump-start" the detection), then the receiver could continue to dwell on the received tone until the effective SNR is measured/estimated to be adequate to decode a "1" or "0" (or other bit combinations, depending on modulation). This hybrid detection could also be accomplished entirely in the analog domain, e.g., using narrow-band analog filters in place of the FFT or Goertzel algorithm to process the received signal.

The message may also be encoded to effect message latency, and may be transmitted via the ionosphere or other atmospheric layers at frequencies in the Medium Frequency (MF), High Frequency (HF), or Very High Frequency (VHF) spectrum.

As one non-limiting example, the disclosed technology may include determining a transmission frequency that falls within the HF spectrum as the frequency for transmitting the message to a receiver device. A message transmitted at this frequency may propagate from its origin to the ionosphere and be refracted back towards its destination. In this example, the destination is located at a remote distance from the origin, for example hundreds of miles away.

The disclosed technology may be employed to transmit messages relating to financial transactions, such as the above example of HFT transactions. For example, HFT technology may include the use of computing devices to move into and out of financial positions in fractions of a second. In such a field, tens of microseconds of latency difference for getting a trade to market may be relevant to a trader.

In the world of HFT, traders leverage highly frequent price fluctuations on exchanges, even though such fluctuations may be relatively small. In general, the objective of an HFT trader is to be the first or fastest trader, or at least equally as fast as other traders, to get an order to market or to an exchange. Getting a piece of competitive intelligence or other information, or completing a trade a few milliseconds faster than other traders may be worth tens of millions of dollars to a trader. In this and other applications, various aspects of the disclosed technology may be employed to reduce message latency.

Illustrative Operating Environments/Devices

FIG. 1 is a diagram of environment 100 in which aspects of the technology may be practiced. As shown, environment 100 includes transmitter device 110 (also referred to herein as a transmitter) and receiver device 120 (also referred to herein as a receiver). Receiver device 120 may be located hundreds of miles away from transmitter device 110. As one non-limiting example, transmitter device 110 is adapted to transmit messages to receiver device 120 via Radio Frequency (RF) transmission 140 that is at least partially propagated and/or refracted through ionosphere 150.

Transmitter device 110 and receiver device 120 may be virtually any type of general- or specific-purpose computing devices that are respectively capable of transmitting and receiving messages via RF signals. Such computing devices may be user devices such as desktop computers, laptop computers, and the like, or server devices such as server computers, virtual computing host computers, and the like. As further examples, transmitter device 110 and receiver devices 120 may be specific-purpose computing devices such as HFT servers, supercomputers running specialized HFT processes, and the like. The computing devices may further include or be coupled to one or more external radios and/or antennas, or include radios and/or antennas.

As illustrated in FIG. 1, transmitter device 110 launches RF transmission 140 at a certain angle. Once launched, RF transmission 140, carrying a message, propagates to ionosphere 150 and at least partially refracts back to earth 130 before reaching receiver device 120 at a location remote from transmitter device 110. As illustrated in FIG. 1, the message may be received at receiver device 120. Due to various factors, the message may be decoded by receiver device 120 at some point in time after it was transmitted by transmitter device 110. This delay may be referred to as "message latency."

As used herein, "message latency" refers the length of time it takes a particular message to traverse a system, and in a communication system, generally refers to the time it takes for a particular message to get from a point of origin to a point of destination and be decoded. Message latency depends on factors such as the speed of the transmission medium and delays associated with devices in the communication system. In various communication systems of the disclosed technology, real time or almost instantaneous communications may be desirable and message latency may be a specific consideration. As used herein, "message latency" includes multiple components, including: transmitter latency, propagation latency, and receiver latency. In the environment of FIG. 1, message latency depends on the time it takes for transmitter device 110 to transmit the message, on the propagation latency associated with RF transmission 140, and on the time it takes for receiver device 120 to decode the message.

As used herein, "transmitter latency" refers to the latency caused by the radios, encoders, modulators, amplifiers, antennas, and any other equipment associated with transmission of the message. As one example, transmitter latency may include the delay between the time a message is received for transmission by transmitter device 110 and the time it is launched as RF transmission 140.

As used herein, "propagation latency" refers to the time it takes for a signal to propagate from the point of origin to the point of destination. Propagation latency may also depend on the transmission medium. As one example, propagation latency may include, or be substantially based on, what is commonly referred to as time-of-flight, air propagation, channel delay, transmission delay, or channel latency. In at least one example, the propagation latency, τ, may at least substantially reflect the equation:

$$\tau = \frac{2R_o}{c} \sum_{1}^{n} \left[ \frac{\sin d/2R_o}{\cos(\Delta + d/2R_o)} \right] \times 10^3,$$

where τ is the time of flight, c is the speed of light, n is a number of ionospheric hops between transmitter device 110 and receiver device 120, d is a length of a hop, Δ is an elevation angle, and Ro is the radius of the earth. Also, the elevation angle, Δ, may at least substantially reflects the equation:

$$\Delta = \tan^{-1}\left(\cot\frac{d}{2R_o} - \frac{R_o}{R_o + h_r}\csc\frac{d}{2R_o}\right),$$

where $h_r$ is an equivalent plane-mirror reflection height. In one example, $h_r$ is 110 km for E modes. In another example, $h_r$ is given by $$h_r = \frac{1490}{M(300)F2} - 176 \text{ or } 500 \text{ km},$$

whichever is smaller

As used herein, "receiver latency" refers to the latency caused by the radios, amplifiers, antennas, and any other equipment associated with reception and decoding of the message. As one example, receiver latency may include the delay between the time a message is received at receiver device 120 and the time it is decoded (e.g., a point in time at which an action can be triggered or otherwise initiated in response to the message). As noted above, the receiver latency of a message communicated using the present technology may be proportional to or otherwise associated with the SNR at the receiver at the time that message is received. For example, the receiver latency may correspond at least substantially to a signal-to-noise ratio for a received wireless signal.

As also noted above, the receiver latency may be automatically adjusted for each message based on SNR with which that particular message is received. In other words, the receiver latency may be said to depend on the instantaneous channel conditions at the time that message travels across the wireless medium and/or the SNR of the received signal. Additionally, the receiver latency may differ on a message-by-message basis, e.g., because channel conditions may be different at the time each particular message is traveling through the wireless medium. Further, the receiver latency may be represented as, or said to be, an analog value. For example, the receiver latency of at least one example can be any of infinite values in a non-infinite range.

Further, the receiver latency of the message communicated using the present technology may be independent of and/or invariant with respect to a size of the message. For example, the present technology may transmit all, or at least multiple, bits of a message in parallel such that "extra" latency is not associated with the size of the message. In such an example, all, or at least multiple, bits of the message can be communicated with the latency typically associated with a single bit. In various examples, a message size on the order of a handful of bits is employed to simplify parallel transmission of all bits of a message. However, other example systems may employ messages of any suitable size.

In one non-limiting example, the raw bits representing a message (i.e., the bits representing an originally received message, without error correction or encryption) are transmitted in RF transmission 140 to effect low message size latency. However, encoding the originally received message into a fewer number of bits may further reduce message size latency. For example, a "buy 1,000 IBM" message requesting a financial transaction may be received at transmitter device 110 for transmission to receiver device 120. As received, this message may include more than 100 bits. However, this received message may be encoded to a smaller number of bits, for example, six bits "010100," where the first three bits, "010," represent the security, "IBM," the fourth bit, "1," represents a transaction, "buy," and the last two bits, "00," represents a transaction quantity of "1,000." In such an example, the encoding and/or the meaning of the various bits may be known to the receiver device 120, e.g., known a priori. The number of bits in such an encoded message is less than the number of bits in the originally received message; therefore, it may be simpler to effect parallel transmission of all bits of the encoded message.

As illustrated in FIG. 1, RF transmission 140 propagates and refracts at or in ionosphere 150. Such propagation and refraction is generally due to differing electron densities at the various layers of ionosphere 150. In this example, the electron density at each of these layers varies with time of day, time of a solar cycle, and/or with time of year. However, the disclosed technology includes various aspects for estimating time-of-flight, and thus for estimating propagation latency, based on several variables. For example, these variables may include the carrier frequency of RF transmission 140, the elevation angle of RF transmission 140, the number of earth/ionospheric bounces between transmitter device 110 and receiver device 120, the number of transmitter/receiver hops between transmitter device 110 and receiver device 120, the time of day, and the distance associated with the bounces.

FIG. 1 is also illustrative of other environments in which the disclosed technology may be employed. For example, RF transmission 140 may be a transmission in the MF spectrum, HF spectrum, or VHF spectrum, or be a tropospheric transmission. Also, RF transmissions in the HF spectrum are also known as skywave transmissions, i.e. due to at least partial propagation of these RF transmissions via refraction from ionosphere 150 to other points on earth 130. Skywave transmissions may be distinguished from ground wave transmissions, i.e., propagation of a low frequency RF transmissions (generally below 2 MHz) relatively near the surface of earth 130, may be between approximately 3 MHz and 30 MHz, and may employ a carrier frequency. Various aspects of the disclosed technology may be employed with Skywave transmissions, ground wave transmissions, and/or other suitable transmissions.

Figure 2:
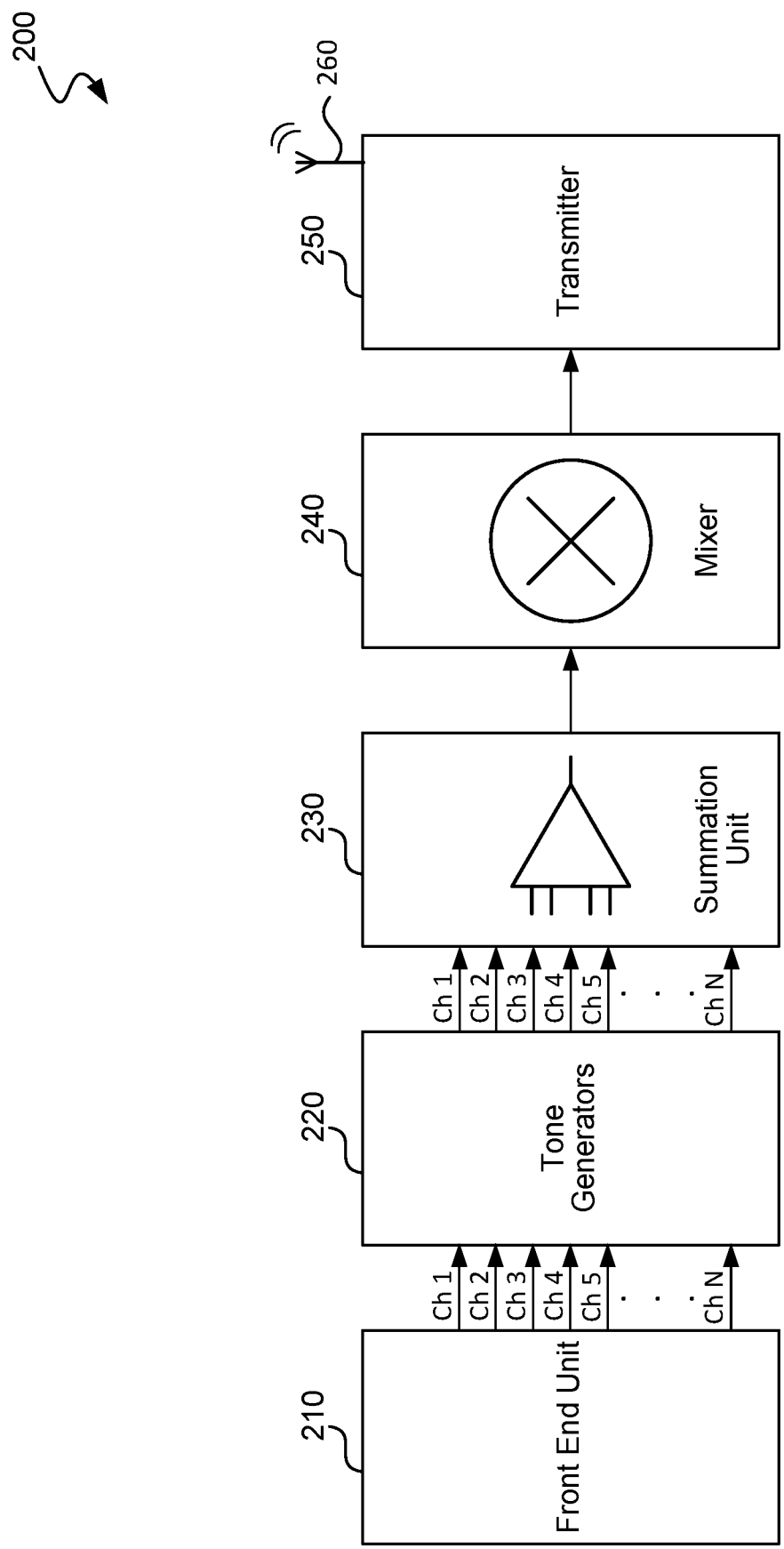
FIG. 2 is a block diagram illustrating functional blocks of a transmitter device in which aspects of the technology may be employed.

FIG. 2 is a block diagram illustrating functional blocks of transmitter device 200, which may be an example of transmitter device 110 in FIG. 1. As illustrated, transmitter device 200 is a computing device that includes front end unit 210, tone generator 220, summation unit 230, mixer 240, transmitter 250, and antenna 260. Transmitter device 200 may also include a data storage memory (not shown in FIG. 2). Transmitter device 200 may also include other, additional, or fewer components.

In one example, transmitter device 200 is adapted to transmit messages to receiver devices at locations remote from transmitter device 200. For simplicity of illustration, transmitter device 200 is illustrated as a double-sideband amplitude modulation transmitter device. However, in other examples, transmitter device may be a single-sideband amplitude modulation transmitter device, or a transmitter device employing any type of modulation or keying, including those types of modulation and/or keying that are mentioned herein.

In one example, front end unit 210 is adapted/configured to receive messages, e.g., a multi-bit message, for wireless transmission to one or more remote receiver devices. The received message may be or include a request for a financial transaction, a request for information, information, a status indication, and/or the like. Further, the action represented by the message value may be communicated or otherwise known to the receiver device before the message itself is received by the receiver device. The received message may be received from a user or from another computing device. Transmitter device 200 may also be adapted to internally generate the message.

In the examples where messages are received by transmitter device 200, messages may be received at front end unit 210 via a user entry device, such as a keyboard, a pointing device, a touch pad, a camera, or a microphone. However, messages may also be received via other types of user entry devices. Likewise, messages from another computing device may be received at front end unit 210 via a communication port coupled to the other computing device, e.g., via a wireless or wired communication network. Further, transmitter device 200 itself may generate messages, e.g., as a result of an execution of an internal process, such as a HFT trading process.

Front end unit 210 may be further adapted to extract information from the received message, and the extracted information may include (1) a transaction type, such as buy or sell, (2) a representation of a security or financial instrument of interest, and/or (3) a quantity. Other information may also be extracted from the received message by front end unit 210.

Front end unit 210 may also be adapted to encode the received message for low latency message transmission, for example, by (1) encoding each extracted information into a bit or sequence of bits, and (2) concatenating the bits and/or sequences into a predefined order, thus generating an encoded message. In one example, the predefined order may start with a sequence of bits representing a trading symbol of interest, followed by a bit or sequence of bits of the encoded transaction type, and a sequence of bits of the encoded quantity. Different orders of sequences of bits are also possible. For example, the encoded transaction type may be the first bit or sequence in the encoded message, followed by a bit or sequence representing a security of interest, and a bit or sequence representing a quantity.

Front end unit 210 may use a look up table (LUT) to encode the information of the received message, with the LUT associating each information with a particular bit or sequence of bits. Front end unit 210 may also encode the received message based on a predefined rule for manipulating the bits in the received message. In some examples, the resulting message generated by front end unit may include a relatively small number of bits, e.g., 2-10 bits. However, other examples may differ.

The resultant message from front end unit 210 may be received by tone generator 220, and tone generator 220 may be adapted selectively generating tones at frequencies corresponding to the constituent bit positions of the multi-bit message. For example, tone generator 220 may generate a signal at a sinusoidal signal or other tone of a given frequency if the value of the corresponding bit position is a "1", and not generate the tone at that frequency if the value of that bit position is "0." However, in other examples, tone generator 220 may generate a tone for a "0" but not for a "1." In this way, the presence or absence of a signal at a frequency corresponding a particular bit position may represent the value of that bit. In addition, tone generator 220 may also be adapted to generate a pilot tone at a pilot frequency, e.g., for use by the receiving device to determining detection timing. As discussed above, the receiving device may determine detection timing according to a length of time for an output of an integration of at least one of the frequencies, e.g., the pilot frequency, to reach a detection threshold. However, this detection timing need not be based on the pilot bit, pilot tone, or pilot frequency.

The tone(s) from tone generator 220 are then passed to summation unit 230, which may be configured to sum the plurality of frequencies into a summed signal. Summation unit 230 may include a summing amplifier, analog adder, and/or the like. However, other circuits or components are possible. Additionally, an alternate transmitting device may employ a multi-frequency/multi-tone signal generator, e.g., in place of tone generator 220 and summation unit 230. This and other variations are possible.

The summed signal is then received by mixer 240, which may be configured to mix the summed signal with a carrier signal into a mixed signal. In one example, mixer 240 includes a local oscillator, a voltage controlled oscillator, a variable frequency oscillator, a carrier signal generator, and/or the like. Such oscillator or generator may be adapted to generate a carrier signal for mixing with the summed signal. In addition, mixer 240 may include a summing amplifier, analog adder, and/or the like, that is adapted to mix the generated carrier signal with the summed signal. In one example, mixer 240 is coupled to transmitter 250, and is further adapted to provide the mixed signal to transmitter 250 for over-the-air transmission.

As illustrated in FIG. 2, transmitter 250 is adapted to receive a mixed signal from mixer 240, and is adapted to transmit the mixed signal into a wireless medium to receiver device 120 (FIG. 1). For example, transmitter 250 may be configured to transmit the mixed signal through at least a portion of an ionospheric layer and/or a tropospheric layer. In one example, transmitter 250 includes a power amplifier adapted to amplify the signal to the antenna based on a determined transmission power. The power amplifier may be further adapted to drive a transmitting antenna, such as antenna 260. In some examples, transmitter 250 may include a low noise amplifier, a power amplifier, a filter, and a matching network, and/or the like. However, transmitter 250 may include other, additional, or fewer components.

Figure 3:
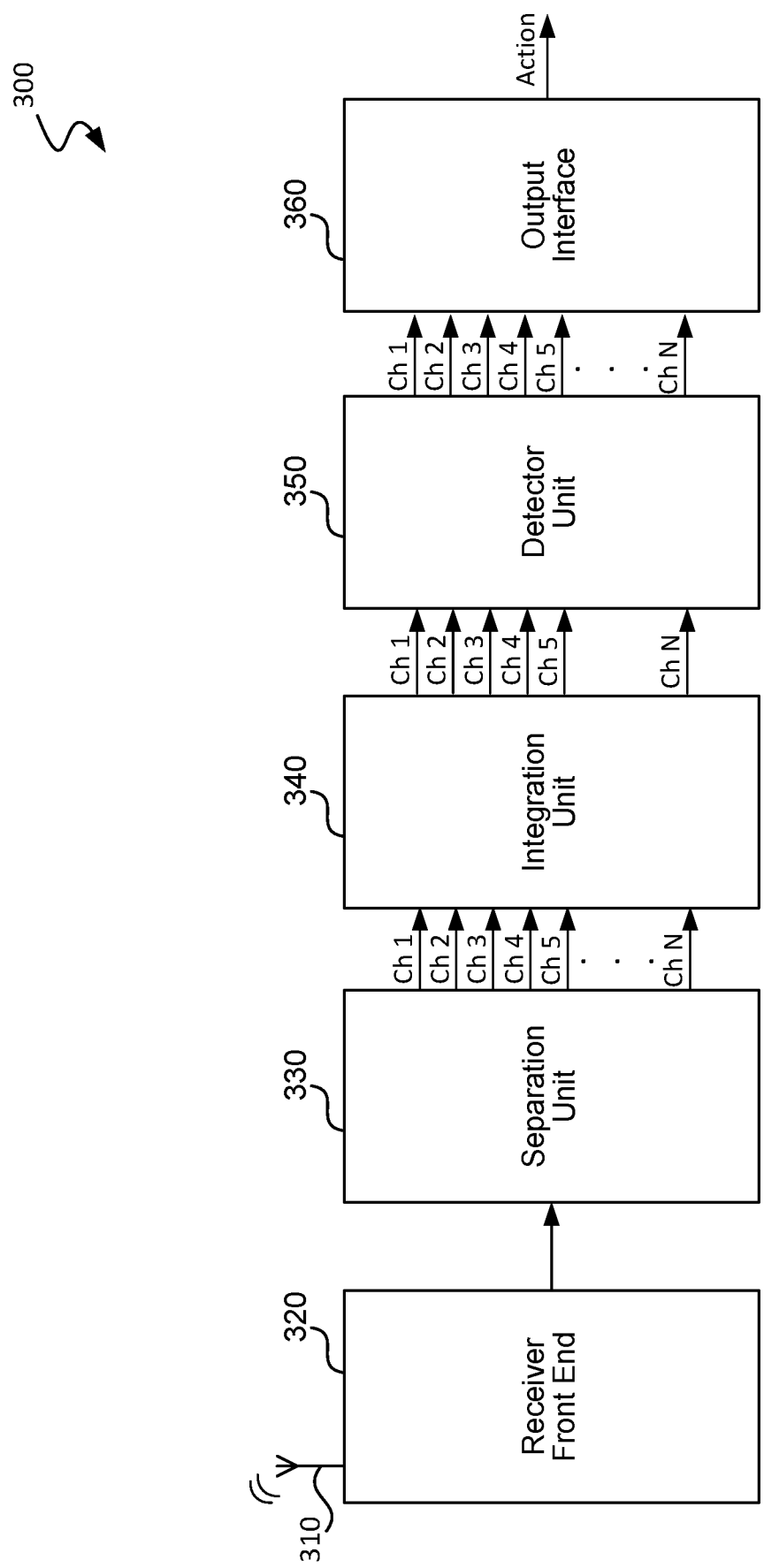
FIG. 3 is a block diagram illustrating functional blocks of a receiver device in which aspects of the technology may be employed.

FIG. 3 is a block diagram illustrating functional blocks of receiver device 300, which may be an example of receiver device 120 in FIG. 1. As illustrated, receiver device 300 is a computing device that includes antenna 310, receiver front end 320, separation unit 330, integration unit 340, detector unit 350, and output interface 360. Receiver device 300 may also include a data storage memory (not shown in FIG. 2). Receiver device 300 may also include other, additional, or fewer components. In one example, receiver device 300 is adapted to receive and decode messages from transmitter device 200. For simplicity of illustration, receiver device 300 is illustrated as an amplitude modulation receiver device. However, other types of receiver devices are possible.

As illustrated in FIG. 3, receiver front end 320 is adapted to receive a wireless signal from transmitter device 110 (FIG. 1) via antenna 210 and perform front end radio processing of the signal. In the illustrated example, receiver front end 320 includes a pre-amplifier (e.g., a low noise amplifier), a mixer (e.g., a down-converter), a filter, an intermediate frequency amplifier, a beat frequency oscillator, and a product detector. Such components may operate together to "recover" the summed signal from transmitter 200. However, receiver front end 320 may include other, additional, or fewer components in any suitable arrangement.

The output of receiver front end 320 is received as input to separation unit 330. As shown, separation unit 330 is adapted to separate, e.g., "extract," separate signals for each of multiple encoding frequencies. For example, separation unit 330 may include a plurality of band-pass filters where each of the plurality of band-pass filters is configured to filter out a particular frequency of the plurality of frequencies. In various examples, separation unit 330 may employ either analog or digital filters of any suitable frequency and bandwidth.

The output of separation unit 330 is coupled to integration unit 340 which is adapted to individually integrate the output of separation unit 330. For example, integration unit 340 may include a plurality of integrators that are individually associated with a corresponding bit of the message. Such integrators may be adapted to integrate a signal power of particular sub-channels at least until an integrated value from at least one integrator crosses a detection threshold. These integrators may include analog integrators (e.g., RC integrators, operational amplifier circuits, etc.) and/or digital integrators. Further, the integration unit 340 may include rectifiers, e.g., to prevent negative-going swings of a signal from lowering integrated values.

The integrated values from integration unit 340 may be passed to detector 350, which may be configured to detect when the integrated value from at least one integrator crosses a detection threshold. In response to such detection, detector 350 may be adapted to decode the message encoded in the wireless signal, e.g. based on integrated values from each of the plurality of integrators at that time. For example, detector 350 may decode the individual bits of a message based on comparison of the integrated value of corresponding integrators to a bit value threshold at the time of detection.

The bit value threshold may be any suitable value, and may be the same as or different than the detection threshold. In some examples, the detection threshold and/or the bit value threshold is dynamically determined. For example, one or more of these thresholds may be determined by dividing the wireless signal by the estimated or measured noise (before integration). Alternately or additionally, one or both of these thresholds could be manually or automatically determined based on the estimated or known noise levels on the wireless signal or in an adjacent or nearby frequency channel.

In various examples, values from any suitable integrator or set of integrators may be employed for triggering the decoding. In one example, decoding is triggered e.g., by a comparator, when integration of a pilot tone reaches the detection threshold. However, in other examples, the decoding could be triggered by the first integrator to reach the detection threshold, when a set number of integrators reach the detection threshold, and/or the like.

Once decoded, the message is passed to output interface 360. In one example, output interface 360 is adapted to perform an action, known a priori to the receiver device, based on the decoding of the encoded message. For example, the action may include executing a financial transaction such as an HFT trade. In another example, output interface 360 may initiate a transaction in response to the message detection/message decoding, e.g., by transmitting an instruction, via another communications channel.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 4:
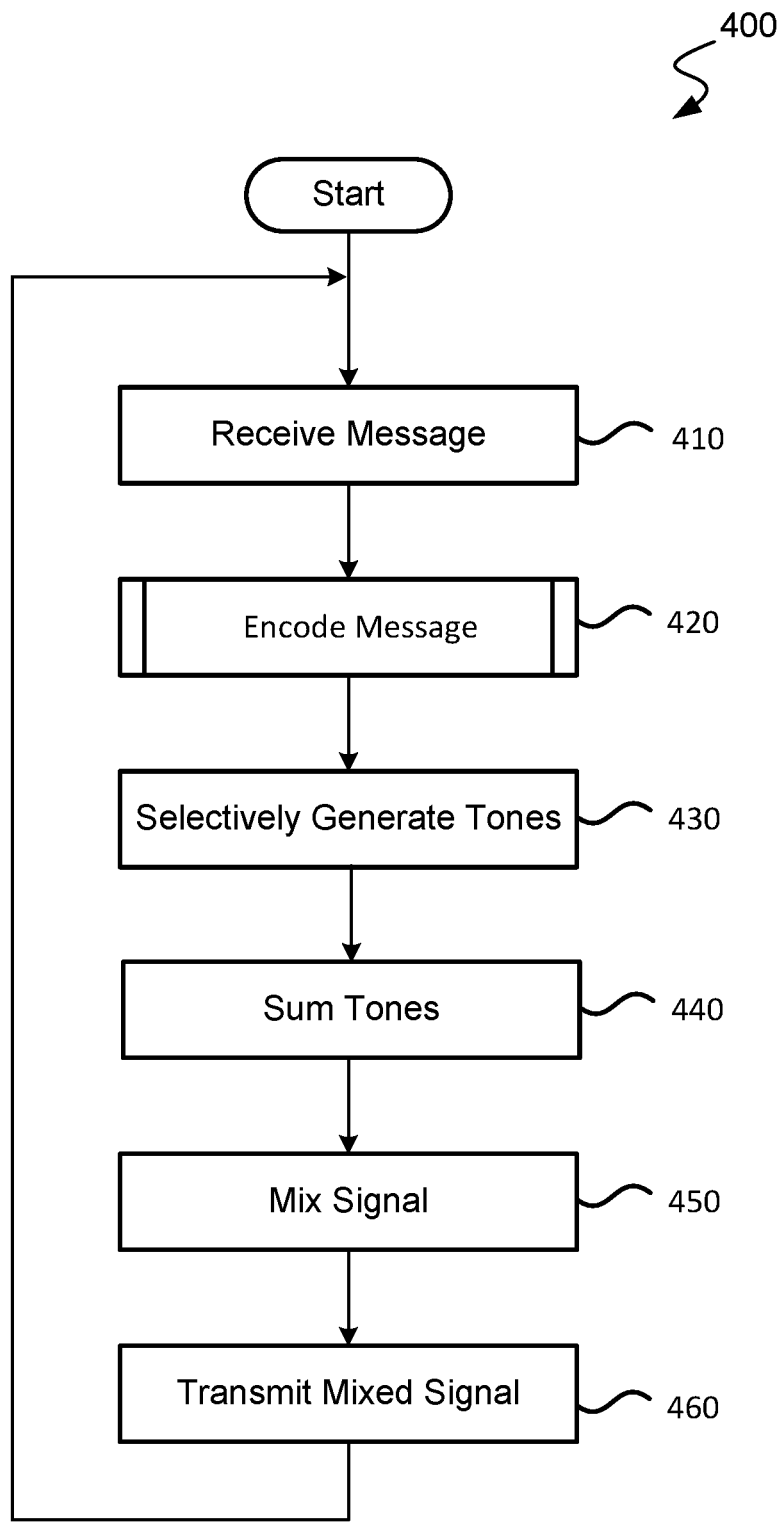
FIG. 4 is logical flow diagram illustrating a process for transmitting messages according to aspects of the technology.

FIG. 4 is a logical flow diagram illustrating process 400 for low latency message transmission. Low latency wireless transmission process 400 begins at 410 where a transmitter device, for example, transmitter device 110, receives a message for transmission. In one example, a front end unit of a transmitter device receives the message for transmission to a remote receiver device. The message may be received from a user. However, the message may also be received from another computing device or be internally generated by the transmitter device.

Process 400 continues to 420 where the received message is encoded. As one example, input interface 210 encodes the received message into a sequence of bits derived to reduce message latency, e.g., the sequence of bits of the encoded message contains fewer bits than the received message. As previously discussed, inclusion of fewer bits is associated with a smaller message size, and thus may reduce message size latency.

Figure 5:
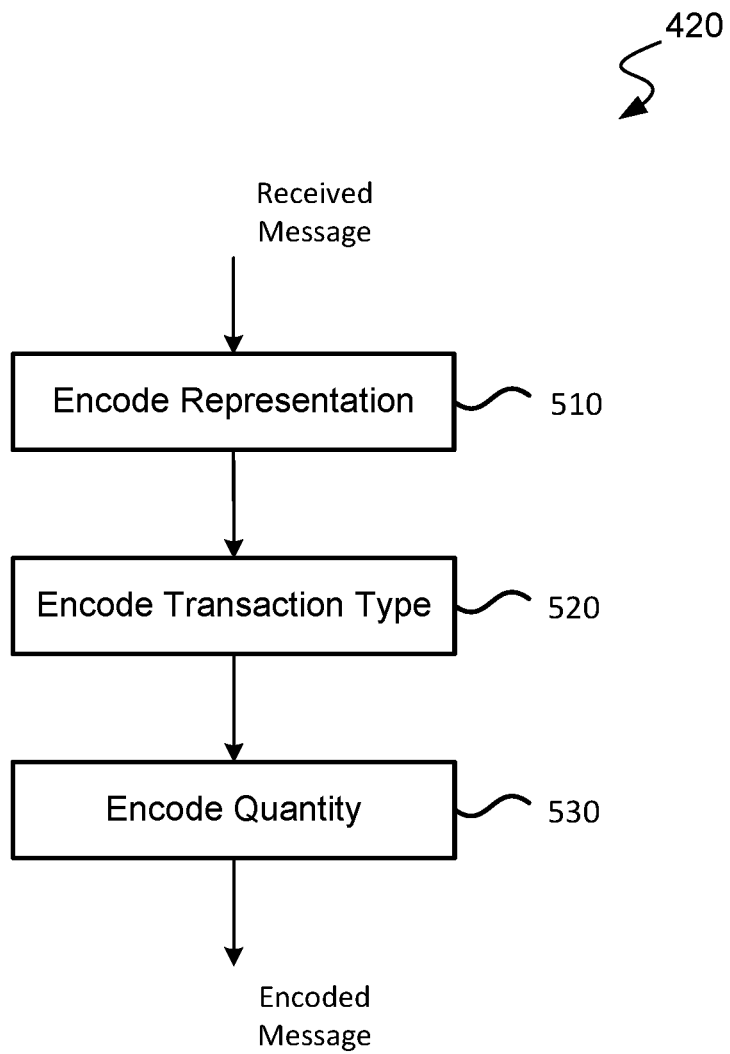
FIG. 5 is a logical flow diagram illustrating a process for encoding messages according to aspects of the technology.

An example of a process of 420 is illustrated in the logical flow diagram of FIG. 5. As illustrated in FIG. 5, process 420 starts at 510 where a representation (e.g., a trading symbol or other representation of a stock, bond, forward, future, option, or other security or financial product, etc.) is encoded as a sequence of bits. In one example, three bits are used to represent up to eight different trading symbols. A combination of n bits may be used to represent up to $2^n$ different trading symbols and these bit combinations may be known a priori by the receiver device. The sequence of bits encoding each trading symbol may be static or dynamic, and they may be known to both the transmitter device and the receiver device.

In another example, the number of bits in a sequence of bits representing a trading symbol is the same as the number of different trading symbol of interest. In this example, three trading symbol of interest are arranged serially in a particular order. Each security is then represented by a sequence of three bits with only one of the bits being a "1," the rest being "0," where the location of the "1" bit in the sequence corresponds to the position of the trading symbol in the arrangement. For example, if trading symbol A, B, and C are used in an example system, and are arranged as A, B, C; trading symbol A may be represented as "100," B as "010," and C as "001."

In yet another example, each trading symbol is represented by a particular transmission time. In this example, trading symbol A is represented by a transmission at 10:00:10 AM, and trading symbol B is represented by a transmission at 10:00:40 AM. Thus, a message transmission originated at 10:00:10 AM by transmitter device 110 in this example is interpreted by the receiver device as a message associated with trading symbol A.

Returning to FIG. 5, process 420 moves to 520 where a transaction type, such as "sell" or "buy," is encoded as a bit or a sequence of bits. With two possible transaction types, one bit encoding may be sufficient, e.g., "1" for buy and "0" for sell. However, other types of transactions, such as limit orders, stop loss orders, or other transaction types may be employed in some environments. Thus, sequences of bits may be assigned to encode these other transaction types. As with the representations, the bit or sequence of bits encoding a transaction type may be may be static or dynamic and be known to both the transmitter device and the receiver device.

From 520, process 420 proceeds to 530 where each quantity of interest is encoded as a sequence of bits. Quantities of interest and their associated sequence of bits may be may be static or dynamic and may be known to both the transmitter device and the receiver device.

Although the example of process 420 is presented in one logical order of sub processes as illustrated in FIG. 5, there is no limitation as to the order of the sub processes of 420, e.g., 510, 520, and 530 may be performed in any order, or in parallel, or combinations thereof. The process of 420 may produce an encoded message, e.g., a message that is in a format derived to effect message latency.

Returning to FIG. 4, process 400 then flows to 430 where tones are selectively generating at frequencies corresponding to the constituent bit positions of the multi-bit message. For example, a tone generator may be employed to selectively generate tones such that the presence or absence of a tone at a frequency corresponding a particular bit position may represent the value of that bit. In addition, 430 may include generating a pilot tone at a pilot frequency, e.g., for use by the receiving device in triggering message decoding.

From 430, process 400 flows to 440 where the tones are summed into a summed signal, for example, by adding the tones with a summing circuit such as a summing amplifier, analog adder, and/or the like. Process 400 then flows to 450 where the summed signal is mixed with a carrier signal into a mixed signal. In one example, 450 includes generating a carrier signal for mixing with the summed signal, then mixing the carrier signal with the summed signal using a summing amplifier, analog adder, and/or the like. From 450, processing flows to 460 where the mixed signal is transmitted to an antenna, such as antenna 240 (FIG. 2).

Figure 6:
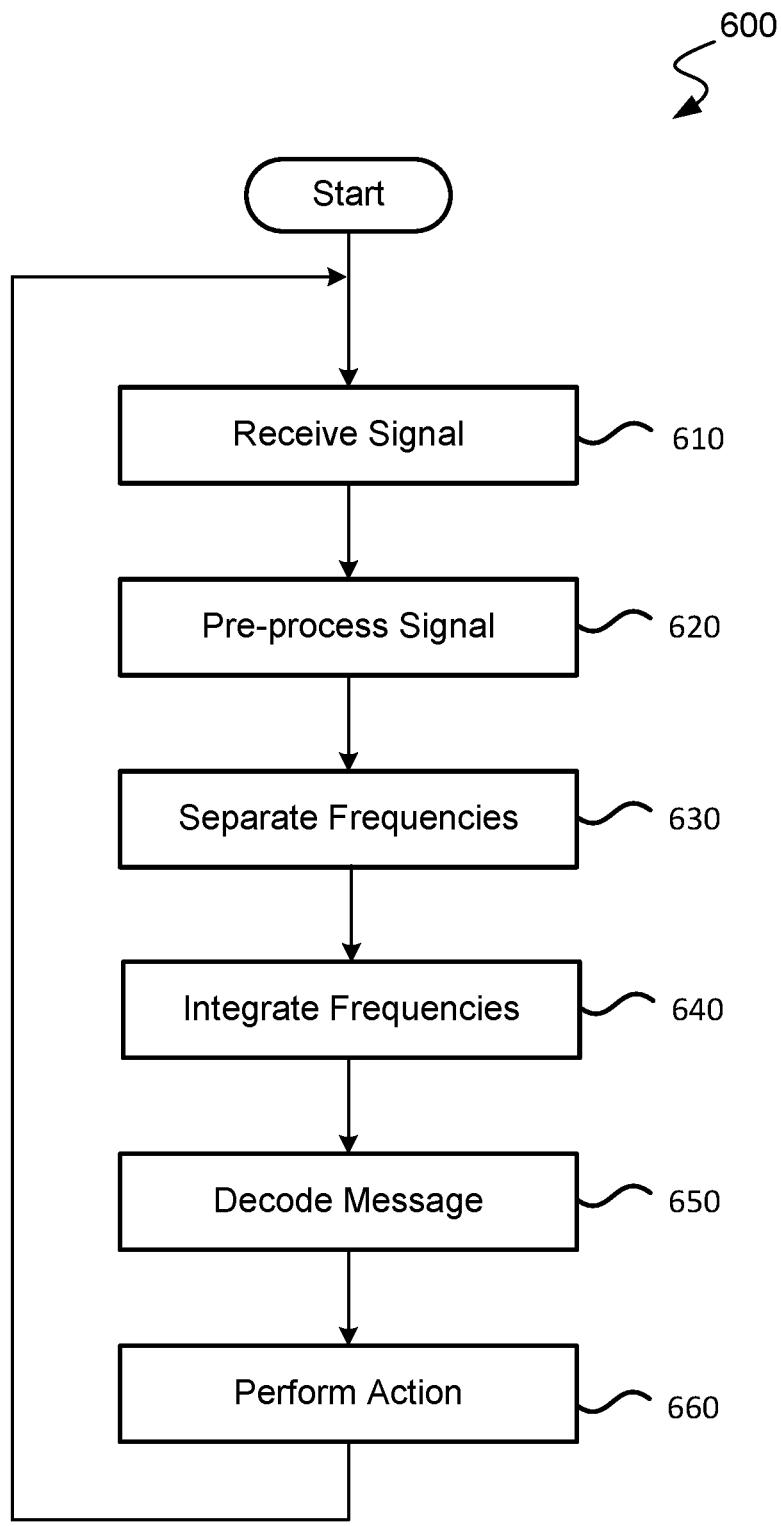
FIG. 6 is logical flow diagram illustrating a process for receiving messages according to aspects of the technology.

FIG. 6 is a logical flow diagram illustrating process 400 for low latency message reception. Process 400 begins at 410 where a receiver device, for example, receiver device 120, receives a wireless signal that was transmitted from a remote transmitter. In one example, the wireless signal is received at a receiver front end via an antenna. However, the wireless signal may be received in other suitable ways.

Following reception, the wireless signal is pre-processed at 620. For example, the pre-processing may include amplifying the wireless signal, mixing/down-converting, filtering, signal detection/recovery, demodulation, and/or the like. After pre-processing, processing flows to 630. At 630, separate signals for each of multiple encoding frequencies are separated, e.g., "extracted," for the encoding frequency(-ies). For example, a plurality of band-pass filters may be employed to separately filter out particular frequencies of a plurality of encoding frequencies. In one example, this signal separation could be said to be a recovery of the set of tones used to generate the wireless signal, e.g., the tones generated at 430 (FIG. 4).

From 630, processing flows to 640 where the separated signals are integrated. For example, this integration may be performed by a plurality of integrators (one for each bit position/sub-channel), until an integrated value from at least one integrator of the plurality of integrators crosses a detection threshold. As discussed above, this crossing of the detection threshold may be employed as a trigger for decoding and/or as an indication that a message is deemed to have been received with sufficient reliability. From 640 processing flows to 650.

At 650, the received message is decoded. For example, the received message may be decoded on comparison of the integrated values of corresponding integrators to a bit value threshold at the time of detection. However, decoding may be performed in other suitable ways.

Following 650, processing flows to 660 where an action is performed. For example, 660 may include receiver device 300 performing an action, known a priori to the receiver device, in response to the decoding of the message. In one example, the action may include executing a financial transaction such as an HFT trade. In another example, 660 may include initiating a transaction, e.g., by transmitting an instruction, to perform a trade, via another communications channel. For example, the other communications channel may include an optic, copper, or microwave communications link. 660 may also optionally include sending an acknowledgement or other message to the transmitter or other device.

Illustrative Message Encodings

FIG. 7 is a table showing examples of encoded messages based on one implementation of 420 (FIG. 4). As shown in Table 1 of FIG. 7, a sequence of three bits represents an encoded trading symbol, one bit represents an encoded transaction type, and three bits represent the encoded quantity. In these examples, an encoded message is six bits. No channel coding, interleaving, redundancy, or encryption is employed for these examples.

FIG. 8 is a table showing additional examples of encoded messages based on another implementation of 420 (FIG. 4). As shown in Table 2 of FIG. 8, a sequence of three bits is used as an encoded representation of a trading symbol, one bit is used as a representation of the encoded transaction type, and three bits are used a representation of the encoded quantity.

FIG. 9 is a table showing yet other examples of encoded messages based on yet another implementation of 420 (FIG. 4). As shown in the Table 3 of FIG. 9, a time slot of the transmission represents a trading symbol of interest, one bit is used to encode the transaction type, and three bits are used to encode the quantity. In this implementation, a time out period may be implemented to prevent a receiver device from executing an erroneous trade if the encoded message is received outside its expected time slot.

Illustrative Computing Devices

Figure 10:
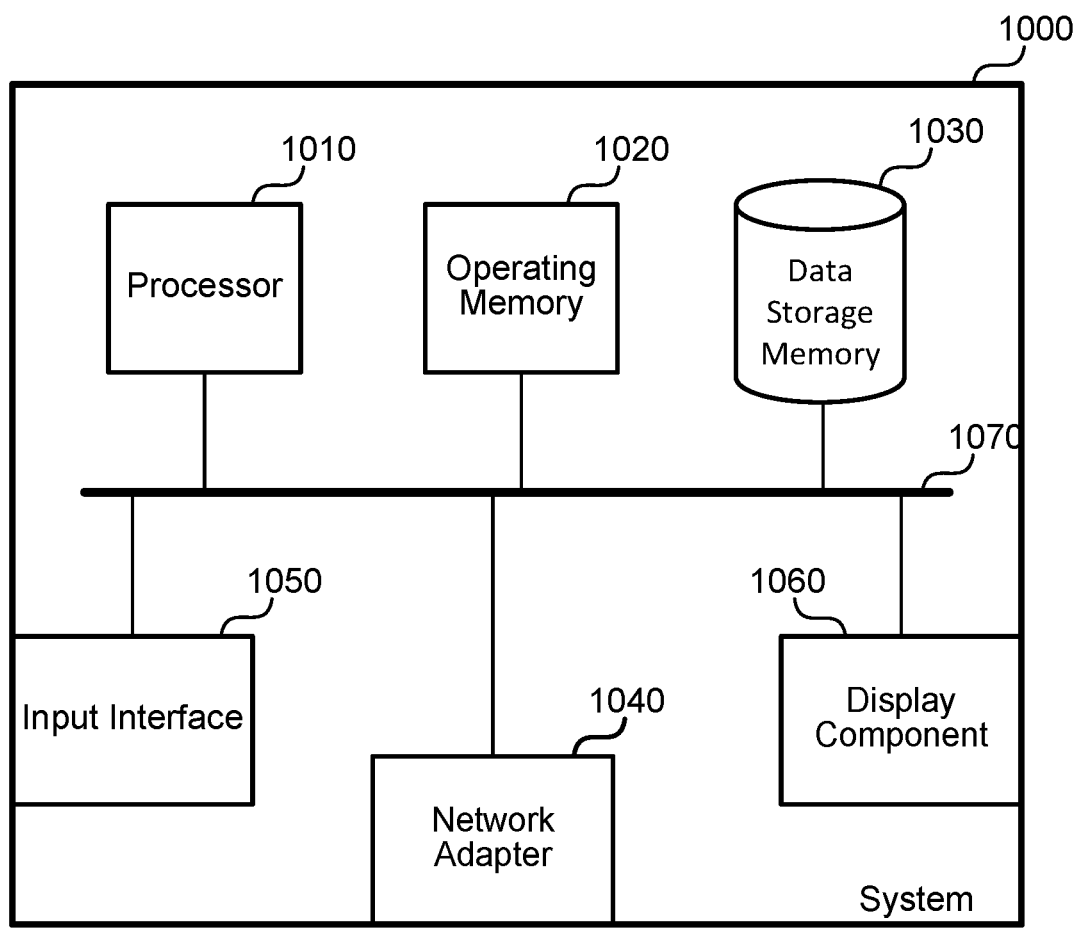
FIG. 10 is a block diagram illustrating example hardware components of a computing device in which aspects of the technology may be practiced.

FIG. 10 is a high-level illustration of example hardware components of computing device 1000, which may be used to practice various aspects of the technology. For example, computing device 1000 may be employed to perform process 400 of FIG. 4, and/or process 500 of FIG. 5. Computing device 1000 may also be an embodiment of transmitter device 110 or receiver device 100 of FIG. 1, or an embodiment of transmitter device 200 of FIG. 2. As shown, computing device 1000 includes processor 1010, operating memory 1020, data storage memory 1030, network adapter 1040, input interface 1050, and display component 1060. These aforementioned components may be interconnected by bus 1070.

As with transmitter device 200, computing device 1000 may be virtually any type of general- or specific-purpose computing device. For example, computing device 1000 may be a user device such as a desktop computer, a laptop computer, a tablet computer, a display device, a camera, a printer, or a smartphone. Likewise, computing device 1000 may also be server device such as an application server computer, a virtual computing host computer, or a file server computer.

Computing device 1000 includes at least one processor 1010 adapted to execute instructions, such as instructions for implementing the above-described processes or technology. The aforementioned instructions, along with other data (e.g., datasets, metadata, operating system instructions, etc.), may be stored in operating memory 1020 and/or data storage memory 1030. In one example, operating memory 1020 is employed for run-time data storage while data storage memory 1030 is employed for long-term data storage. However, each of operating memory 1020 and data storage memory 1030 may be employed for either run-time or long-term data storage. Each of operating memory 1020 and data storage memory 1030 may also include any of a variety of data storage devices/components, such as volatile memories, semi-volatile memories, non-volatile memories, random access memories, static memories, disks, disk drives, caches, buffers, or any other media that can be used to store information. However, operating memory 1020 and data storage memory 1030 specifically do not include or encompass communications media, any communications medium, or any signals per se.

Also, computing device 1000 may include or be coupled to any type of computer-readable media such as computer-readable storage media (e.g., operating memory 1020 and data storage memory 1030) and communication media (e.g., communication signals and radio waves). While the term computer-readable storage media includes operating memory 1020 and data storage memory 1030, this term specifically excludes and does not encompass communications media, any communications medium, or any signals per se.

Computing device 1000 also includes input interface 1050, which may be adapted to enable computing device 1000 to receive input from users or from other devices. In addition, computing device 1000 includes a display component 1060, which may be adapted to render displays. In one example, display component 1060 includes a frame buffer, graphics processor, graphics accelerator, or a virtual computing host computer and is adapted to render the displays for presentation on a separate visual display device (e.g., a monitor, projector, virtual computing client computer, etc.). In another example, display component 1060 includes a visual display device and is adapted to render and present the displays for viewing.

Another example of an implementation of the disclosed technology is a radio that leaves the bulk of message processing to an external processing unit, such as a central processing unit (CPU), a field programmable gate array (FPGA), or an application specific integrated circuit (ASIC).

In one example, a communication connection between the external processing unit and the radio may be selected based on latency. For example, Firewire 1394a is one example of a communication connection that contributes very little to message latency and thus may be employed. Other potentially suitable communication connections such as Gigabit Ethernet, Fibre Channel, and the like may also be employed.

In one example, a radio's sampling rate and buffer size are determined based on a channel bandwidth constraint, as previously discussed. One or more combinations of sampling rate and buffer size that generate spectral emission within the predefined channel bandwidth may be implemented in such a radio.

In another example, a radio may use separate channels for transmitting and receiving (e.g., full duplex communication.)

The disclosed technology may be used in combination with fiber-optic, copper, or microwave communication links, either with one transmitter or with more than one transmitters, e.g., controlled by a common transmission controller. In one example, a transmitter device or a receiver device may be coupled to an exchange or Internet Service Provider via fiber-optic, copper, or microwave communication links. In another example, a message transmitted via a RF transmission may be supplemented with a transmission via fiber-optic, copper, or microwave communication links, of additional information associated with the message.

Conclusion

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

I claim:

1. A receiver device, comprising:
a receiver front end circuit that is configured to receive a signal;
a plurality of band-pass filter circuits that are configured to band-pass filter each of multiple encoding frequencies of the received signal, wherein the frequencies are in the High Frequency (HF) spectrum;
a plurality of integrator circuits that are configured to integrate particular sub-channels of a plurality of sub-channels at least until an integrated value from at least one integrator circuit of the plurality of integrator circuits crosses a detection threshold; and
a detector circuit that is configured to, in response to the integrated value from the at least one integrator circuit of the plurality of integrator circuits crossing the detection threshold, decode a message encoded in the signal from integrated values from each of the plurality of integrator circuits, wherein a meaning of the message is known a priori to the receiver device, wherein the message includes at least one of: a request for a financial transaction, a request for information regarding at least one financial instrument, information regarding at least one financial instrument, or a status indication associated with at least one financial instrument.

2. The receiver device of claim 1, further comprising:
a comparator circuit that is configured to detect that the integrated value from at least one integrator circuit of the plurality of integrator circuits has crossed the detection threshold, and to trigger the detector circuit to decode the message responsive to the detection.

3. The receiver device of claim 1, wherein:
the plurality of sub-channels includes a pilot sub-channel on a pilot frequency;
the plurality of frequencies includes the pilot frequency;
the plurality of integrator circuits includes a pilot sub-channel integrator circuit configured to integrate the pilot sub-channel; and
the detector circuit is further configured to decode the message in response to an output of the pilot sub-channel integrator circuit crossing the detection threshold.

4. The receiver device of claim 1, wherein each constituent bit of the message is encoded in the signal based on presence or absence of a tone at a corresponding frequency of the plurality of frequencies.

5. The receiver device of claim 1, wherein each of the plurality of integrator circuits is further configured to integrate the particular sub-channels by integrating a signal power at the corresponding frequency of the plurality of frequencies.

6. The receiver device of claim 1, wherein a length of time for the integrated value from the at least one integrator circuit of the plurality of integrator circuits to cross the detection threshold is at least substantially proportional to a signal-to-noise ratio of the signal.

7. The receiver device of claim 1, wherein:
each of the integrator circuits of the plurality of integrator circuits is associated with a corresponding bit of the message encoded in the signal.

8. The receiver device of claim 7, wherein:
the detector circuit is further configured to decode the message encoded in the signal according to the respective values output by each of the plurality of integrator circuits responsive to the integrated value from the at least one integrator circuit of the plurality of integrator circuits crossing the detection threshold.

9. A method, comprising:
receiving a signal;
band-pass filtering each of multiple encoding frequencies of the received signal, wherein the frequencies are in the High Frequency (HF) spectrum;
integrating particular sub-channels of a plurality of sub-channels until an integrated value from at least one of the particular sub-channels crosses a detection threshold; and
in response to the integrated value from the at least one of the particular sub-channels crossing the detection threshold, decoding a message encoded in the signal from integrated values, wherein a meaning of the message is known a priori to the receiver device, wherein the message includes at least one of: a request for a financial transaction, a request for information regarding at least one financial instrument, information regarding at least one financial instrument, or a status indication associated with at least one financial instrument.

10. The method of claim 9, wherein:
the plurality of sub-channels includes a pilot sub-channel on a pilot frequency;
the plurality of frequencies includes the pilot frequency; and
decoding the message is accomplished in response to an integrated value of the pilot sub-cannel crossing the detection threshold.

11. A transmitter device, comprising:
an input circuit that is configured to determine a first multi-bit message such that the first multi-bit message has a meaning that is known a priori by a receiver device;
a tone generation circuit that is configured to selectively generate tones at frequencies of a plurality of frequencies, wherein the frequencies are in the High Frequency (HF) spectrum, wherein the individual frequencies of the plurality of frequencies correspond to individual bits of the first multi-bit message, and wherein a presence or an absence of a tone at each particular frequency of the plurality of frequencies corresponds to a value of the corresponding bit;
a summation circuit that is configured to sum the tones at the frequencies of the plurality of frequencies into a summed signal;
a mixer circuit that is configured to mix the summed signal with a carrier signal into a mixed signal; and
a transmitter circuit that is configured to transmit the mixed signal in the HF spectrum, wherein the first multi-bit message includes at least one of: a request for a financial transaction, a request for information regarding at least one financial instrument, information regarding at least one financial instrument, or a status indication associated with at least one financial instrument.

12. The transmitter device of claim 11, wherein selectively generating the tones is accomplished such that the mixed signal is capable of being decoded to the first multi-bit message using a variable-latency decoding scheme based on a message latency of the first multi-bit message.

13. The transmitter device of claim 12, wherein the variable-latency decoding scheme includes determining a decoding time according to a length of time for an output of an integration of at least one of the frequencies of the plurality of frequencies to reach a detection threshold.

14. The transmitter device of claim 12, wherein the message latency of the first multi-bit message includes a receiver latency and a delay component that is based on a length of a path between reception and transmission of the mixed signal, the receiver latency is based on a signal-to-noise ratio of the mixed signal, and wherein the receiver latency is invariant with respect to a size of the first multi-bit message.

15. The transmitter device of claim 14, wherein a contribution to the message latency includes a propagation delay, $\tau$, that at least substantially reflects the equation:

$$\tau = \frac{2R_o}{c} \sum_1^n \left[ \frac{\sin d/2R_o}{\cos(\Delta + d/2R_o)} \right] \times 10^3,$$

wherein c is the speed of light, n is a number of hops, d is a length of a hop, $\Delta$ is an elevation angle, and Ro is the radius of the earth.

16. The transmitter device of claim 11, wherein:
the first multi-bit message at least one of includes a pilot bit or employs a pilot tone; and
selectively generating the tones includes generating a pilot tone at a respective pilot frequency of the plurality of frequencies.

17. The transmitter device of claim 16, wherein:
the mixed signal includes the pilot frequency;
selectively generating the tones is accomplished such that the mixed signal is capable of being decoded to the first multi-bit message using a variable-latency decoding scheme based on a message latency of the first multi-bit message and
the variable-latency decoding scheme is associated with a value of the message latency based on a length of time for an output of an integration, at the receiver device, of the pilot frequency to reach a detection threshold.

* * * * *